(12) United States Patent
Mate et al.

(10) Patent No.: US 9,380,328 B2
(45) Date of Patent: Jun. 28, 2016

(54) VIDEO REMIXING SYSTEM

(75) Inventors: Sujeet Mate, Tampere (FI); Igor D. Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 14/127,958

(22) PCT Filed: Jun. 28, 2011

(86) PCT No.: PCT/FI2011/050616
§ 371 (c)(1),
(2), (4) Date: Dec. 19, 2013

(87) PCT Pub. No.: WO2013/001135
PCT Pub. Date: Jan. 3, 2013

(65) Prior Publication Data
US 2014/0136980 A1    May 15, 2014

(51) Int. Cl.
G06F 13/00    (2006.01)
G06F 15/00    (2006.01)
H04N 21/258   (2011.01)
G11B 27/034   (2006.01)
H04N 21/414   (2011.01)
H04N 21/845   (2011.01)
(Continued)

(52) U.S. Cl.
CPC .......... *H04N 21/258* (2013.01); *G06F 3/04847* (2013.01); *G11B 27/034* (2013.01); *H04L 65/4084* (2013.01); *H04N 21/41407* (2013.01); *H04N 21/8456* (2013.01)

(58) Field of Classification Search
CPC .......... G06F 3/04847; G11B 27/034

USPC .......... 715/723, 200, 700, 763, 765, 740, 853
See application file for complete search history.

(56) References Cited

U.S. PATENT DOCUMENTS 8,805,954 B2 *   8/2014  Curcio et al. ............. 709/217
2009/0087161 A1 * 4/2009  Roberts et al. ............ 386/66
2009/0196570 A1 * 8/2009  Dudas et al. ............. 386/52
(Continued)

FOREIGN PATENT DOCUMENTS

WO    2012/175783 A1   12/2012
WO    2013/001138 A1    1/2013

OTHER PUBLICATIONS

International Search Report for corresponding Patent Cooperation Treaty Application No. PCT/FI2011/050616, dated May 23, 2012, 4 pages.
(Continued)

*Primary Examiner* — Kevin Nguyen
(74) *Attorney, Agent, or Firm* — Alston & Bird LLP (57) ABSTRACT

A method and relates apparatus for selecting content for a video remix, the method comprising: sending a request for multimedia preview content from a client device to one or more network domains; receiving one or more multimedia preview content from said one or more network domains; arranging the received multimedia preview content on a display of the client device for a user of the client device to select; and in response to receiving user input indicating selection of one or more preview content, sending a request to a video remix service, the request including pointers to multimedia content on said one or more network domains corresponding to said selected one or more preview content, said pointers enabling the video remix service to download the multimedia content for generating a video remix.

20 Claims, 7 Drawing Sheets

(51) Int. Cl.
*H04L 29/06* (2006.01)
*G06F 3/0484* (2013.01)

(56) References Cited

U.S. PATENT DOCUMENTS

2010/0146055 A1* 6/2010 Hannuksela .................. 709/206
2011/0026898 A1* 2/2011 Lussier et al. ................ 386/280
2012/0060077 A1 3/2012 Mate et al.

OTHER PUBLICATIONS

Vihavainen, S. et al. "We Want More: Human-Computer Collaboration in Mobile Social Video Remixing of Music Concerts", Proceedings of the 2011 annual conference on Human factors in computing systems, CHI'11, Vancouver May 7-12, 2011. ACM, pp. 287-296.

Schmitz et al., "International Remix: Video Editing for the Web", Proceedings of the 14th annual ACM International Conference on Multimedia, Oct. 23-27, 2006, pp. 797-798.

Yuen et al.,"MixNStream: Multi-Source Video Distribution With Stream Mixers", Proceedings of the 2010 ACM workshop on Advanced video streaming techniques for peer-to-peer networks and social networking, Oct. 29, 2010, pp. 77-82.

Extended European Search Report received for corresponding European Patent Application No. 11868778.9, dated Feb. 4, 2015, 6 pages.

International Preliminary Report on Patentability and Written Opinion for corresponding International Patent Application No. PCT/FI2011/050616, dated Jan. 7, 2014.

* cited by examiner

VIDEO REMIXING SYSTEM

RELATED APPLICATION

This application was originally filed as PCT Application No. PCT/FI2011/050616 filed Jun. 28, 2011.

BACKGROUND

Multimedia capturing capabilities have become common features in portable devices. Thus, many people tend to record or capture an event, such as a music concert or a sport event, they are attending. During many occasions, there are multiple attendants capturing content from an event, whereby variations in capturing location, view, equipment, etc. result in a plurality of captured versions of the event with a high amount of variety in both the quality and the content of the captured media.

A livelier recording from the event could be obtained, if a video remix were created that contains some segments selected from the plurality of video recordings. Video remixing, as such, is one of the basic manual video editing applications, for which various software products and services are already available. However, even if there were multiple users covering the same event individually, an individual user do not typically have access to the other captured version of the event from other users. Even if such content were available, for example via a social media portal, uploading large video recordings from a portable device to a service capable of creating a video remix is needed. Thus, users may therefore become interested in an option of leveraging the other version which might have something of particular interest that was not available in his/her version. Also in case of social media that is not from the same event, users may be interested in generating a collection that combines content from multiple events to generate a story that is of their interest.

SUMMARY

Now there has been invented an improved method and technical equipment implementing the method for alleviating the above problems. Various aspects of the invention include methods, apparatuses, a system and computer programs, which are characterized by what is stated in the independent claims. Various embodiments of the invention are disclosed in the dependent claims.

According to a first aspect, there is provided a method for selecting content for a video remix, the method comprising: sending a request for multimedia preview content from a client device to one or more network domains; receiving one or more multimedia preview content from said one or more network domains; arranging the received multimedia preview content on a display of the client device for a user of the client device to select; and in response to receiving user input indicating selection of one or more preview content, sending a request to a video remix service, the request including pointers to multimedia content on said one or more network domains corresponding to said selected one or more preview content, said pointers enabling the video remix service to download the multimedia content for generating a video remix.

According to an embodiment, the method further comprises sending a request to one or more client devices to select more content for the video remix, said request comprising an identifier for a subject of the video remix.

According to an embodiment, the method further comprises arranging the received multimedia preview content from each of said one or more network domains to its own row on the display of the client device for the user of the client device to select.

According to an embodiment, the method further comprises arranging the received multimedia preview content on the display of the client device as thumbnails, said thumbnails being linked to pointers to multimedia content on said one or more network domains corresponding to said thumbnails.

According to an embodiment, the method further comprises receiving a probability distribution function from the video remix service, said probability distribution function estimating upload times of multimedia content regarding said subject of the video remix on said one or more network domains, and estimating a delay of the video remix generation on the basis of the probability distribution function.

According to an embodiment, said one or more network domains comprise social media portals arranged to store and/or share user generated multimedia content.

According to a second aspect, there is provided an apparatus comprising at least one processor, memory including computer program code, the memory and the computer program code configured to, with the at least one processor, cause the apparatus to at least: send a request for multimedia preview content from a client device to one or more network domains; receive one or more multimedia preview content from said one or more network domains; arrange the received multimedia preview content on a display of the apparatus for a user of the apparatus to select; receive user input indicating selection of one or more preview content, and send a request to a video remix service, the request including pointers to multimedia content on said one or more network domains corresponding to said selected one or more preview content, said pointers enabling the video remix service to download the multimedia content for generating a video remix.

According to a third aspect, there is provided a method for creating a video remix, the method comprising: receiving, in a server device, a request from a client device for creating an identifier for a subject of the video remix and for sending the identifier to one or more client devices; sending said identifier to said one or more client devices; receiving from said one or more client devices a request to generate a video remix, the request including said identifier and pointers to multimedia content on one or more network domains; downloading the multimedia content indicated by said pointers; and generating the video remix on the basis of the downloaded multimedia content.

According to an embodiment, the video remix is generated in an iterative process, wherein the input of the process comprises information regarding at least one of the following:
multimedia source content available at the time of the video remix creation,
user feedback of the multimedia source content available the time of the video remix creation,
at least one previous video remix version, and/or
user feedback of the at least one previous video remix version.

According to an embodiment, the iterative process generates a subsequent video remix by using as an input at least the previous version of the video remix.

According to an embodiment, the method further comprises determining a probability distribution function for estimating upload times of multimedia content regarding said subject of the video remix on said one or more network domains.

According to an embodiment, the method further comprises receiving a request from at least one client device for generating the video remix, wherein the request includes criteria for the multimedia content to be included in the video remix, the criteria comprises at least one of the following:
    the number of multimedia content to be included in the video remix,
    the cumulated percentage of all expected multimedia content for said subject, after which percentage the generating of the video remix is started,
    total recording time to be covered by the video remix,
    a range for upload time of multimedia content eligible for the video remix.

According to a fourth aspect, there is provided an apparatus comprising at least one processor, memory including computer program code, the memory and the computer program code configured to, with the at least one processor, cause the apparatus to at least: receive a request from a client device for creating an identifier for a subject of the video remix and for sending the identifier to one or more client devices; send said identifier to said one or more client devices; receive from said one or more client devices a request to generate a video remix, the request including said identifier and pointers to multimedia content on one or more network domains; download the multimedia content indicated by said pointers; and generate the video remix on the basis of the downloaded multimedia content.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which.

DESCRIPTION OF EMBODIMENTS

As is generally known, many contemporary portable devices, such as mobile phones, cameras, tablets, are provided with high quality cameras, which enable to capture high quality video files and still images. In addition to the above capabilities, such handheld electronic devices are nowadays equipped with multiple sensors that can assist different applications and services in contextualizing how the devices are used. Sensor (context) data and streams of such data can be recorded together with the video or image or other modality of recording (e.g. speech).

Usually, at events attended by a lot of people, such as live concerts, sport games, political gatherings, social events, there are many who record still images and videos using their portable devices, thus creating user generated content (UGC). A significant amount of this UGC will be uploaded to social media portals (SMP), such as Facebook, YouTube, Flickr®, and Picasa™, etc. These SMPs have become de facto storages of the generated social media content. The uploaded UGC recordings of the attendants from such events, possibly together with various sensor information, provide a suitable framework for the present invention and its embodiments.

The following describes in further detail suitable apparatuses and possible mechanisms for an enhanced multimedia content remix service. In this regard reference is first made to FIG. 1 which shows a schematic block diagram of an exemplary apparatus or electronic device 50, which may incorporate necessary functions for displaying preview content on the display of the user's apparatus and selecting the content for the remix according to an embodiment of the invention.

Figure 1:
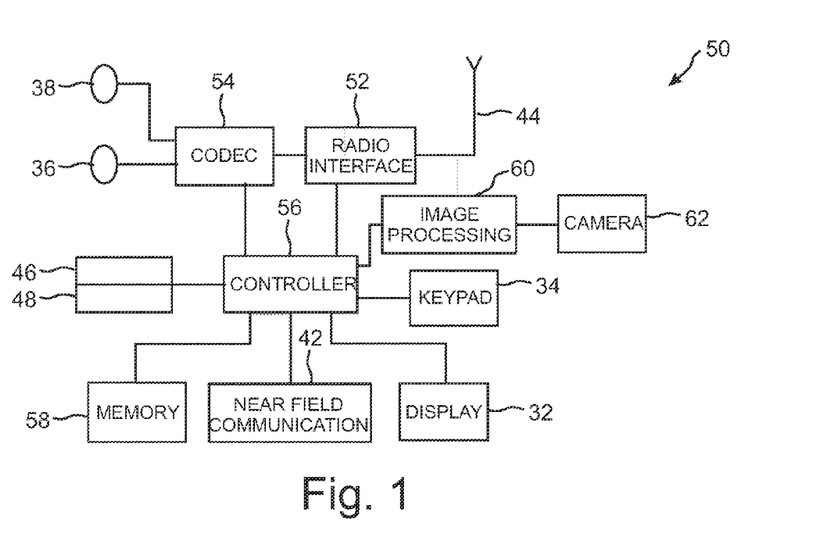
FIG. 1 shows a schematic block diagram of an exemplary apparatus suitable to be used in an video remixing service according to an embodiment.

The electronic device 50 may be, for example, a mobile terminal or user equipment of a wireless communication system, a digital camera, a laptop computer etc. However, it would be appreciated that embodiments of the invention may be implemented within any electronic device or apparatus which may contain multimedia processing properties.

Figure 2:
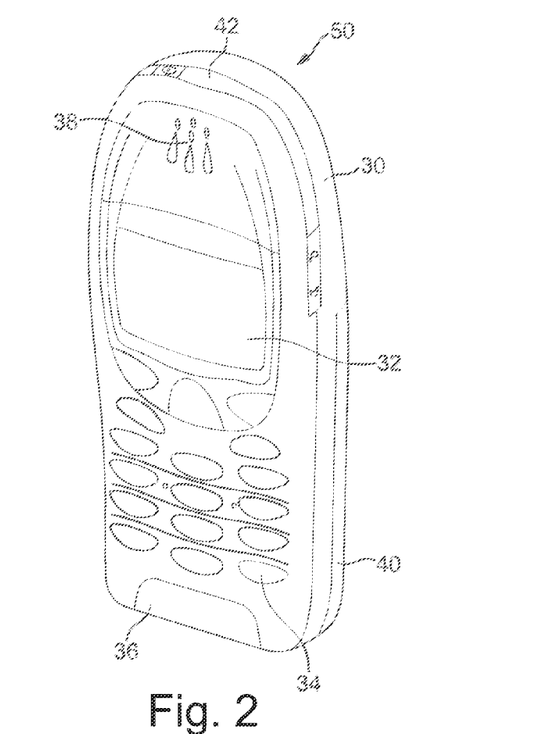
FIG. 2 shows another view of the exemplary apparatus of FIG. 1.

The apparatus 50 may comprise a housing 30 (FIG. 2) for incorporating and protecting the device. The apparatus 50 further may comprise a display 32 in the form of a liquid crystal display. In other embodiments of the invention the display may be any suitable display technology suitable to display an image or video. In some embodiments the display 32 may be a touch-sensitive display meaning that, in addition to be able to display information, the display 32 is also able to sense touches on the display 32 and deliver information regarding the touch, e.g. the location of the touch, the force of the touch etc. to the controller 56. Hence, the touch-sensitive display can also be used as means for inputting information. In an example embodiment the touch-sensitive display 32 may be implemented as a display element and a touch-sensitive element located above the display element.

The apparatus 50 may further comprise a keypad 34. In other embodiments of the invention any suitable data or user interface mechanism may be employed. For example, the user interface may be implemented as a virtual keyboard or data entry system as part of a touch-sensitive display or it may contain speech recognition capabilities. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a near field communication (NFC) connection 42 for short range communication to other devices, e.g. for distances from a few centimeters to few meters or to tens of meters. In other embodiments the apparatus 50 may further comprise any suitable short range communication solution such as for example a Bluetooth wireless connection, an infrared port or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to a codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system and/or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments, the apparatus 50 may comprise a camera 62 capable of recording or detecting individual frames or images which are then passed to an image processing circuitry 60 or controller 56 for processing. In further embodiments, the apparatus may receive the image data from another device prior to transmission and/or storage. In further embodiments, the apparatus 50 may receive either wirelessly or by a wired connection the image for coding/decoding.

Figure 3:
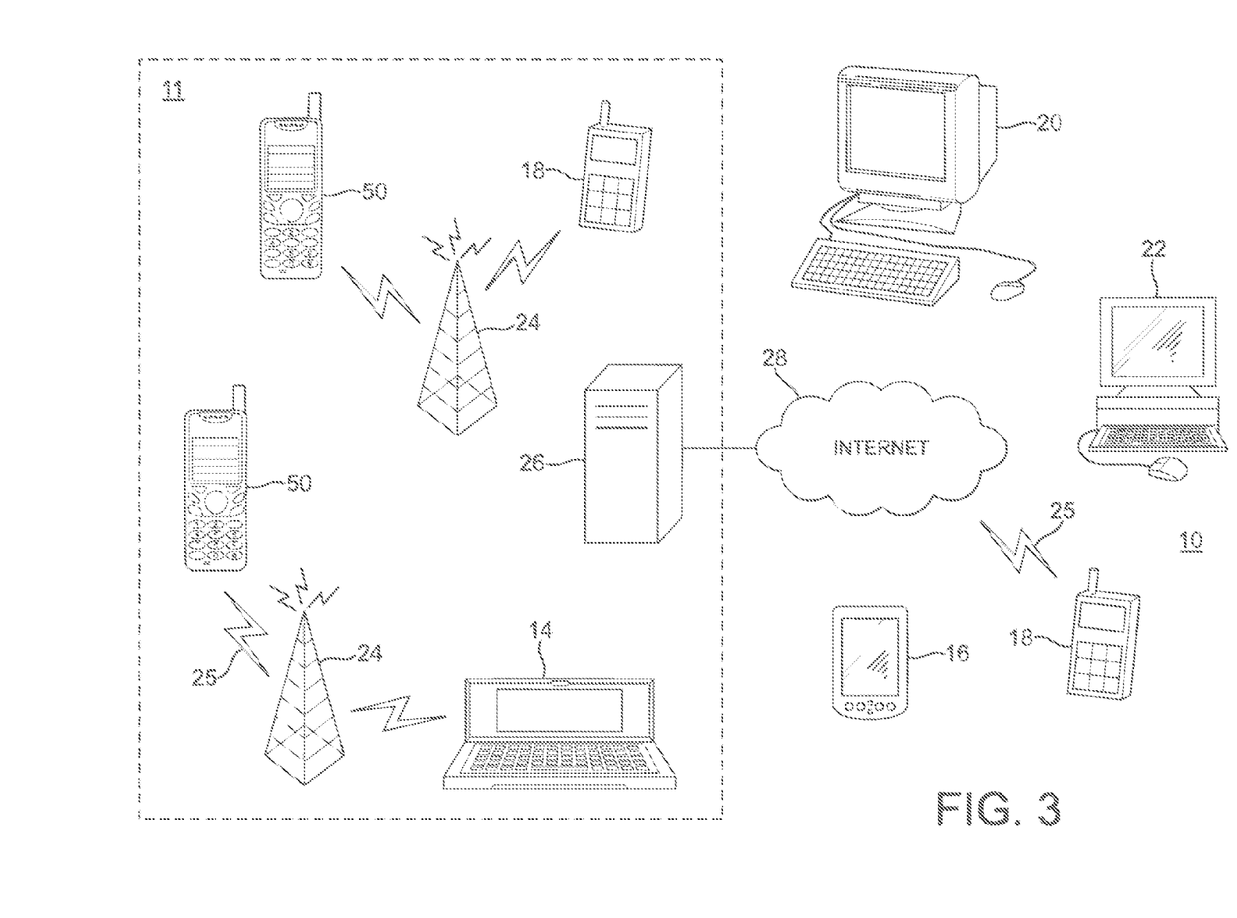
FIG. 3 shows an example of a suitable apparatus to be used in an video remixing service according to an embodiment.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as the global system for mobile communications (GSM) network, 3rd generation (3G) network, 3.5th generation (3.5G) network, 4th generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, a bluetooth personal area network, an ethernet local area network, a token ring local area network, a wide area network, and the Internet.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a computer operating as a network server 22. The apparatus 50 may be stationary or mobile when carried by an individual who is moving. The apparatus 50 may also be located in any mode of transport, such as a vehicle.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

One or more of the computers disclosed in FIG. 3 may be configured to operate a multimedia content remix service, which is herein referred to as a media mixer service (MMS). The MMS is a service infrastructure that is capable of receiving user communication requests for inviting other users. The MMS, together with the computer(s) running the service, further comprise networking capability to receive and process media content and corresponding context data from other data processing devices, such as servers operating social media portals (SMP). Herein, the term social media portal (SMP) refers to any commonly available portal that is used for storing and sharing user generated content (UGC). The UGC content may be stored in a unified format that holds the contextual data together with media data, such as MPEG file format with context data storage extensions. Some examples of popular SMPs are YouTube, Flickr®, and Picasa™.

Figure 4:
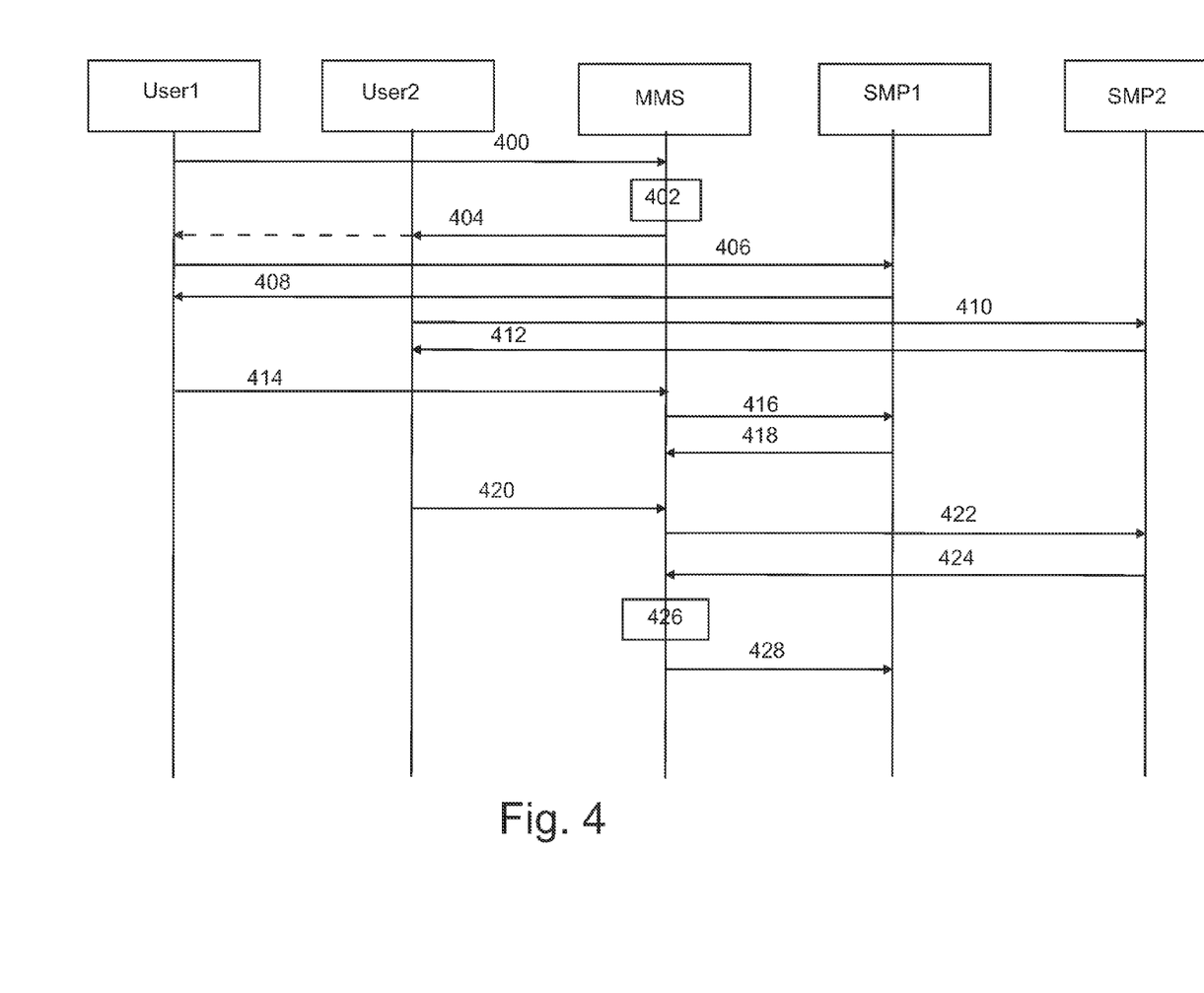
FIG. 4 shows a signalling chart of an exemplary operation of the multimedia content remix service according to an embodiment.

The operation of the multimedia content remix service according to an embodiment is now described in further detail by referring to an example disclosed in a signalling chart of FIG. 4. For the sake of simplifying the illustration, the example of FIG. 4 involves only two users of apparatuses 50, User1 and User2, the media mixer service MMS, and two social media portals, SMP1 and SMP2. It is apparent for a skilled person that the number of apparatus users and social media portals is not limited to only two, but any number of apparatus users and social media portals may be involved in the actual implementation. Furthermore, even though the media mixer service MMS and the social media portals SMP1 and SMP2 are illustrated as single operators in FIG. 4, it is apparent for a skilled person that they are implemented as network domains, wherein the operation may be distributed among a plurality of servers. For carrying out the client-specific tasks relating to the multimedia content remix service, the apparatuses 50 of User1 and User2 are provided with a client application, which is herein referred to as a cloud-based remix creation (CBR) client.

As a starting point for the example of FIG. 4, it is presumed that the users User1 and User2 are aware of user generated content (UGC), such as video recording, relating to a same event ("Event"), which user generated content (UGC) has been uploaded to the social media portals SMP1 and SMP2, respectively. The generated content (UGC) may have been, but not necessarily need to be, captured and uploaded by the users User1 and User2, for example.

For enabling the creation of a remix in the MMS, User 1 creates a virtual "Event" in the MMS by specifying the event metadata and the user data and by signaling (400) said information to the MMS. The user data may comprise a username ("User1") and a social media portal address SMP1 in any suitable address format, like URL. As a part of the event creation message (400), User 1 typically includes a request for one or more users (in this example, at least User2) to contribute content to the MMS for generating a remix. The list of requested users (i.e. user names and social media portal addresses) may either be proprietary to the MMS service or they may be accessed using any suitable social networking portal, such as Facebook.

The MMS generates (402) an EVENT-LINK that is used as a common identifier by the MMS to store the content contributed by different users to the MMS regarding the specified "Event". The MMS then forwards (404) the EVENT-LINK to all users included in the list of users, including User1, for enabling content contribution.

In the example of FIG. 4, User1 then requests (406) preview content from one or more SMPs (in this example, at least from SMP1) where User1 may have stored, for example, his/her recorded content from the "Event". SMP1 responds to the request by sending (408) preview content from the user generated content (UGC) to User1.

According to an embodiment, the SMP may send the preview content according to predefined settings regarding properties of the preview content, such as resolution, size, quality and/or a type of the preview content. The settings may be defined by the SMP, the user or by an automatic adjustment from the apparatus of the user. According to another embodiment, the SMP may adjust the properties of the preview content, such as resolution, size, quality and/or a type of the preview content according to one or more parameters, which may include display capabilities of the user's apparatus, resolutions available in the UGC, network capability through which the user's apparatus is connected, batter status of the user's apparatus, etc.

In similar manner, User2 requests (410) preview content from one or more SMPs (in this example, at least from SMP2) where User2 may have stored, for example, his/her recorded content from the "Event". SMP2 responds to the request by sending (412) preview content from the user generated content (UGC) to User2.

According to an embodiment, the CBR client arranges the preview content to be shown on the display of the user's apparatus in such a form that it enables the user to select the content pointers (e.g., the media URL or other address to point and identify content in a SMP) from the respective SMPs. The aspects of displaying the preview content on the display of the user's apparatus and selecting the content pointers is discussed more in detail in connection with FIG. 5 further below.

User1 selects the pointers of the desired content and sends (414) the information regarding the pointers to the MMS. In response to receiving the pointers to the UGC from User1, the MMS sends (416) a download request to SMP1 for receiving the UGC data defined by the pointers from the SMP1, either at a full resolution or at a requested resolution. The SMP1 sends (418) the requested UGC data at the desired resolution to the MMS.

The same steps are repeated regarding the preview content displayed to User2: User2 selects the pointers of the desired content and sends (420) the information regarding the pointers to the MMS. The MMS sends (422) a download request to SMP2 for receiving the UGC data defined by the pointers from the SMP2, and the SMP2 sends (424) the requested UGC data at the desired resolution to the MMS.

Now the MMS has received the UGC contributed by both User1 and User2. The MMS starts the remix generation (426) by analyzing the context and content data from UGC contributed and thereafter making a selection of the segments of the UGC to be included in the remix. There are many procedures, known as such, for carrying out the remix generation, and the actual procedure used herein is not relevant for the different aspects of the invention. Nevertheless, some embodiments regarding the remix generation are discussed more in detail further below. Subsequently, once the remix has been created, it is made available for the users in the MMS and/or in at least one SMP by sending (428) the remix to SMP1, for example.

From a view point of the service provider operating the MMS, the above procedure can be seen as a method for providing a client device with a video remix service, wherein the method comprises facilitating access to an interface for requesting multimedia preview content from one or more network domains; receiving one or more multimedia preview content from said one or more network domains; facilitating the client device to arrange the received multimedia preview content on a display of the client device for a user of the client device to select; and in response to receiving a request indicating user input selection of one or more preview content, the request including pointers to multimedia content on said one or more network domains corresponding to said selected one or more preview content, said pointers enabling the video remix service to download the multimedia content for generating a video remix.

Figure 5:
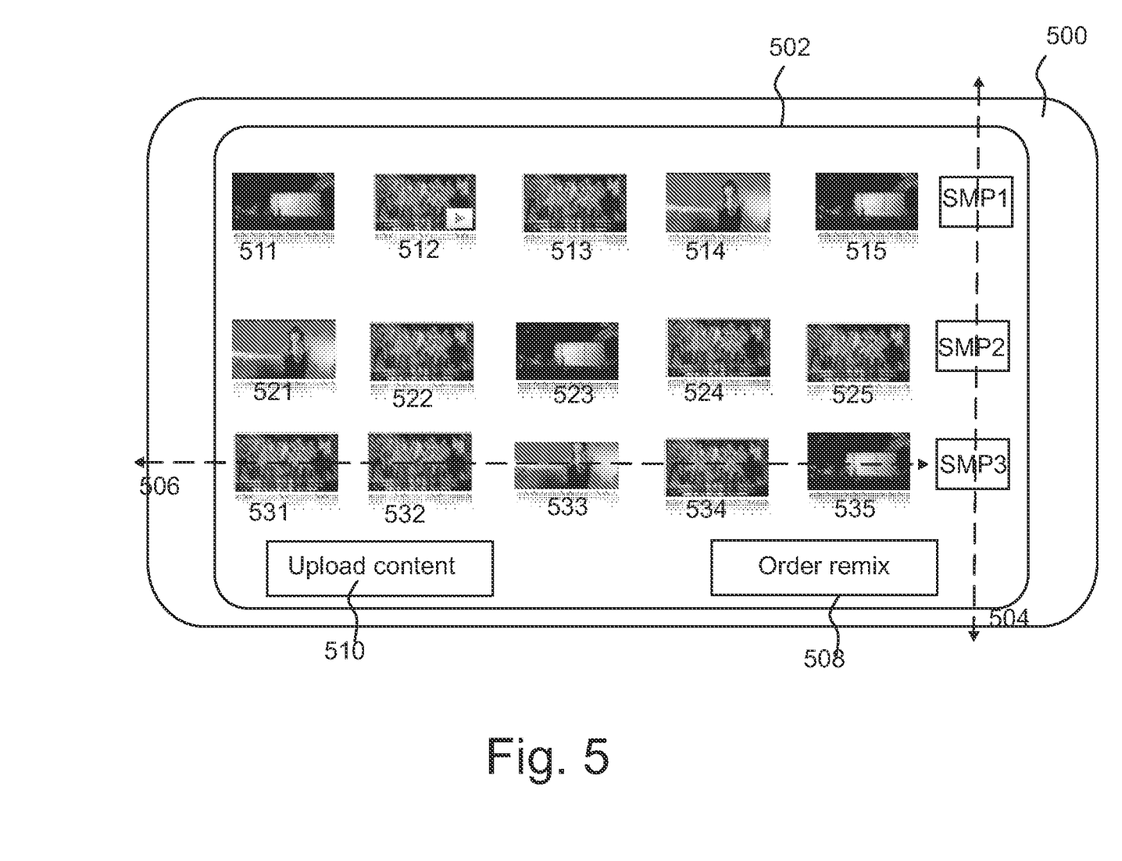
FIG. 5 an example embodiment of the operation of a client application according to an embodiment.

According to an embodiment, the preview content is shown on the display of the user's apparatus in such a form that it enables the user to select the content pointers preferably from one or more SMPs. FIG. 5 shows an example embodiment of the operation of the CBR client in displaying the preview content on the display of the user's apparatus and selecting the content pointers.

FIG. 5 discloses the user apparatus as a portable device 500 provided with a large, preferably touch-sensitive display 502. However, as becomes evident from what has been disclosed above, the user apparatus may also be, for example, a laptop computer, a desktop computer or any other data processing device capable of requesting a remix to be generated. Therefore, this example is not limited to portable devices or touch-sensitive displays only. In this example, the user of the apparatus has downloaded preview content regarding a music concert from at least three social media portals, SMP1, SMP2 and SMP3. The CBR client arranges the preview content from each SMP to its own row; i.e. thumbnails 511, 512, 513, 514, 515, . . . representing the preview content from SMP1 are arranged on the first row, thumbnails 521, 522, 523, 524, 525, . . . representing the preview content from SMP2 are arranged on the second row, and thumbnails 531, 532, 533, 534, 535, . . . representing the preview content from SMP3 are arranged on the third row. The thumbnails of the preview content not currently shown on the display can be found by horizontally scrolling the particular row, which is illustrated by the dotted arrow 506. Similarly, if preview content has been requested from more social media portals than can be shown on the display at the time, the hidden rows of preview content can be found by vertically scrolling the display, which is illustrated by the dotted arrow 504.

The user may select the desired contact pointers, for example by touching the desired thumbnails, if a touch-sensitive display is available, or by indicating the desired thumbnails by other pointing means, such a mouse. Once the desired thumbnails have been selected, the user may start the remix generation process by activating the "Order remix" function (508), in response to which the CBR client configures the apparatus to send the information regarding the pointers to the MMS.

When the user has captured or otherwise obtained new content in the user apparatus, he/she may upload selected new source content to the MMS or to a social media portal SMP by activating the "Upload content" function (510), in response to which the CBR client configures the apparatus to upload the selected content to the desired destination. Depending on the implementation, the upload of new content selection may be treated by the MMS as an order for a new automatic video remix. Alternatively, uploading source content selection information and remix ordering can happen sequentially, whereby the upload of new content selection does not automatically start the creation of a new video remix. The user apparatus preferably provides a function for customizing the automatic remix order based on user preferences and for storing the customization preferences in connection with profile information.

As mentioned above, there are a variety of procedures, known as such, for carrying out the remix generation. However, these known procedures typically face with a problem of how to optimally combine the content captured by the users in the event into a remix. The resulting summary video resulting from the remix creation process depends on the source content utilized in generating the remix. A problem is that the user generated content (UGC) related to an event does not get contributed to the service, for example to the MMS, at the same time. Consequently, since the remix is always a function of the contributed source content, it does not include all the potential source content if the remix is generated too early after the event. On the other hand, if the remix creation is delayed until the entire source content collection is expected to be available, it may be generated too late to be an up-to-date topic.

Another problem due to the gradual contribution of source content is that multiple remix versions may be created and viewed by users. Creating a new remix version from the beginning is wasteful use of the resources of the remix generation system, which does not utilize the previous versions of the remix and salient/non-salient aspects while generating the subsequent remix version.

A video remix, which has been created according to the preferences of a user, is sometimes referred to as a Director's Cut (DC). Now according to an embodiment, a new process for creating a remix in an iterative manner is disclosed, wherein the remix, i.e. the summary created using source content is referred to as Director's cut (DC), wherein the process may optionally involve utilizing a previous version of Director's cut.

The source content refers to all types of media that is captured by users, wherein the source content may involve any associated context data. For example, videos, images, audio captured by users may be provided with context data, such as information from various sensors, such as from a compass, an accelerometer, a gyroscope, or information indicating location, altitude, temperature, illumination, pressure, etc. A particular sub-type of source content is a source video, which refers to videos captured by the user, possibly provided with the above-mentioned context information.

Figure 6:
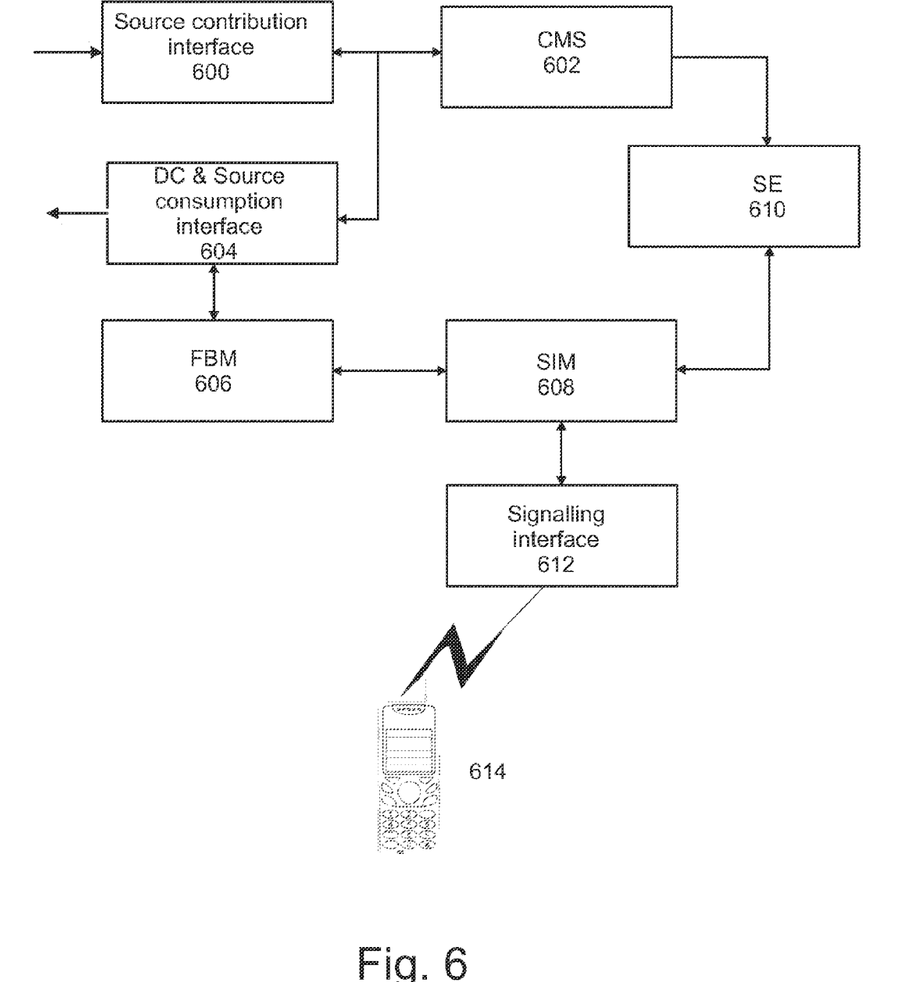
FIG. 6 shows an exemplified service architecture for creating a Director's Cut (DC) in an iterative manner according to an embodiment.

FIG. 6 shows an exemplified service architecture for creating a Director's Cut (DC) in an iterative manner according to an embodiment. The service architecture may include components, known as such from contemporary video editing services, for example an interface 600 for the users contributing their recorded content from the event, which interface may annotate the contributed content for clustering the content related to the same event for generating the DC, a content management system (CMS; 602) to store/tag/organize the content, and an interface 604 for delivering the DC and its related source content for the users to consume.

The service architecture of FIG. 6 further comprises a feedback module (FBM; 606) to capture the content consumption feedback about the content contributed by the users and the DC versions that have been generated. The feedback information is provided to a synergistic intelligence module (SIM; 608), which contains the required intelligence or the logic required to analyze and create the information about the user contributed source content that is contributed to the service. The SIM is connected to a user apparatus 614 via a signalling interface 612, which enables the user to request a DC to be created according to user-defined parameters and also to provide new UGC content to be used in the DC generation process.

In the analysis the SIM may utilize, in addition to the feedback information, also information about the arrival distribution pattern of the source content. The SIM may use the UGC contribution data from past events in various locations and use it to generate a probabilistic model to predict user content contribution's arrival time (or upload time) to the service. Embodiments relating to this will be described more in detail further below.

The information provided by the SIM are received in a synergizing engine (SE; 610), which may be implemented as a separate module that interacts with the CMS, the SIM and the FBM to generate the DC versions that match the criteria signalled by the user requesting a DC.

The information provided by the SIM enables the SE to utilize the previous DC versions and their consumption feedback as inputs, in addition to the newly provided source content and its consumption feedback, wherein the SE changes the weights of different parameters which are used to combine the multitude of content.

According to an embodiment, the service architecture of FIG. 6, for example, may be utilized in an iterative creation process of Director's cut (DC), wherein a DC is generated by inputting, to the synergizing engine (SE; 610), information regarding to at least one of the following:
  source content available at the time of DC creation,
  user consumption feedback (ranking, rating, other suitable user feedback methods) of the source content available at that point of time,
  the previous DC versions, and/or
  user consumption feedback (ranking, rating, other suitable user feedback methods) of the previous DC versions.

According to an embodiment, the DC generation process is iterative by including continuous recycling of previously generated one or more DCs, wherein the previous DCs are considered as source content in addition to the newly contributed source content.

Figure 7:
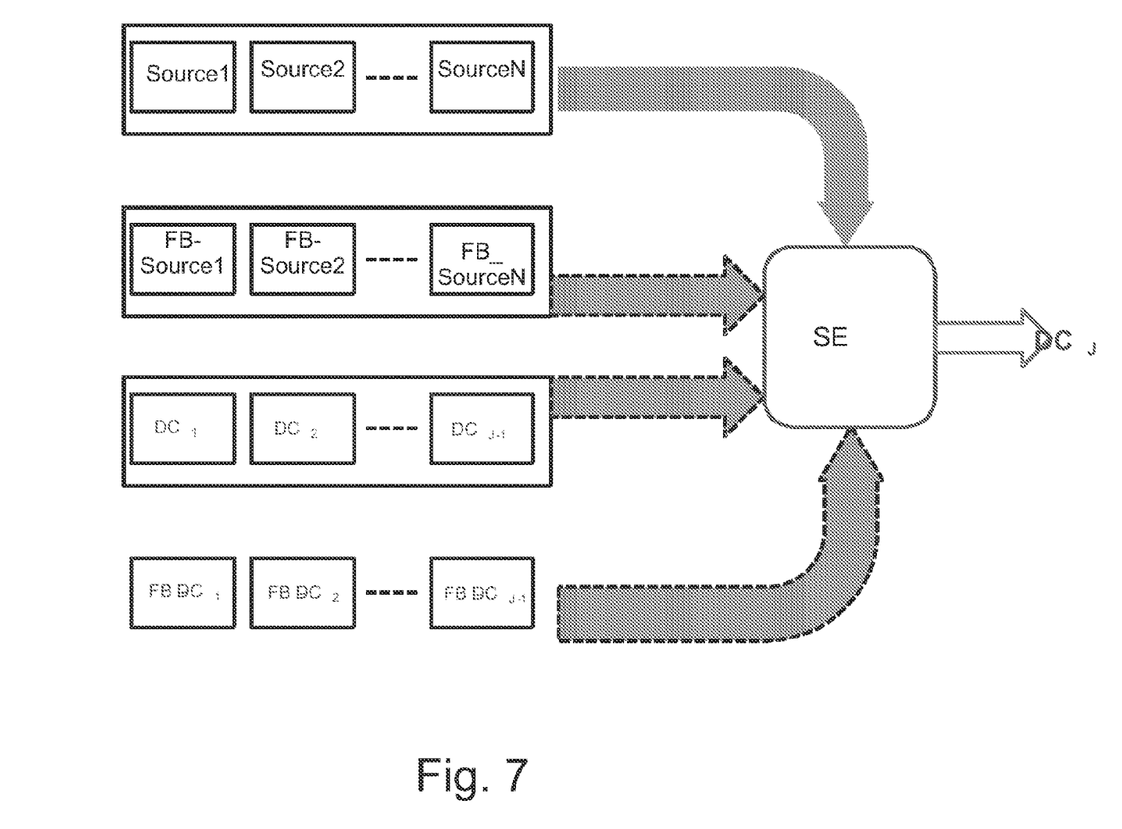
FIG. 7 shows a general principle of an iterative Director's Cut (DC) creation according to an embodiment.

The general principle of the iterative DC creation is illustrated in FIG. 7. According to an embodiment, the iterative DC creation can be defined as:

$DC_1 = SE(\{Source_1, Source_2, \ldots, Source_k\}, \{FB\text{-}Source_1, FB\text{-}Source_2, \ldots, FB\text{-}Source_k\})$;

$DC_2 = SE(\{Source_1, Source_2, \ldots, Source_{k+a}\}, \{FB\text{-}Source_1, FB\text{-}Source_2, \ldots, FB\text{-}Source_{k+a}\} \{DC_1\}, \{FB\text{-}DC_1\})$;

. . .

$DC_j = SE(\{Source_1, Source_2, \ldots, Source_N\}, \{FB\text{-}Source_1, FB\text{-}Source_2, \ldots, FB\text{-}Source_N\}, \{DC_1, DC_2, \ldots, DC_{j-1}\}, \{FB\text{-}DC_1, FB\text{-}DC_2, \ldots, FB\text{-}DC_{j-1}\})$, where $N > k+a > k$, $a > 0$, and FB=Feedback.

SE( ) represents the synergizing engine (SE; 610) which is a function of
  N available source content,
  consumption feedback (FB) for the N source content,
  earlier J−1 versions of the DCs,
  consumption feedback for the previous J−1 DCs which are used to generate the Jth version of DC.

By analysing social media portal, such as YouTube, it has been observed that there is a delay between the recording time of the video and the upload time of the video, wherein the delay can be approximated as a probability distribution function (PDF) with specific characteristics. The PDF can be estimated based on source content arrival time from previous events of similar type in similar geographical location, since the uploading behavior can vary based on the various factors (both technical factors like network availability as well as non-technical factors like technical saviness, cultural preferences, etc).

Figure 8A:
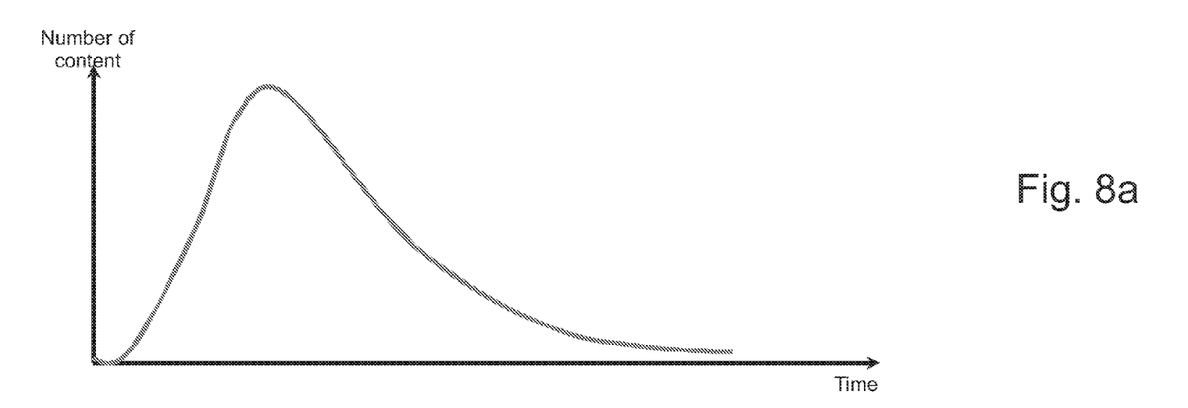
FIGS. 8a and 8b show examples of a probability distribution function PDF estimating the probability of a new source video content to arrive at a certain time and a corresponding cumulative distribution function CDF.
Figure 8B:
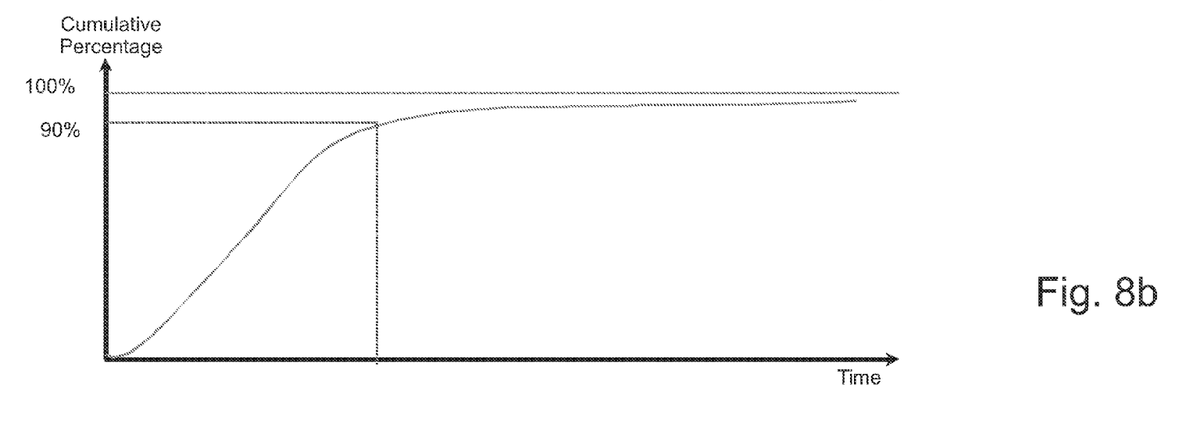

It is generally observed that video contribution for an event picks up gradually after the event and starts falling with a long-tail after reaching the peak such that the distribution curve is typically quite close to Poisson distribution. FIGS. 8a and 8b illustrate examples of a probability distribution function PDF and a corresponding cumulative distribution function CDF. The probability distribution function PDF estimates the probability of a new source video content to arrive at a certain time and the corresponding cumulative distribution function CDF shows an estimation of the cumulative percentage of all source video content as a function of arrival time. Thus, the CDF enables to determine when a DC with X % of the expected user generated videos can be included for generating the DC. Using hysteresis, the time after which a sufficiently large portion (for example 90%) of the source content has been contributed to the DC creation service can be estimated.

The PDF can be estimated based on various parameters, for example in terms of, but not limited to, the number of videos arriving, the duration of recorded content arriving, the amount of users contributing and the part of the event captured. The PDF can be updated also by using user contribution data available from the current event to fine tune the distribution curve. The probabilistic model helps in estimating future arrivals and consequently enables the service to inform the user about the expected time when a DC generated utilizing the desired UGC contribution profile is included.

According to an embodiment, the user may choose the percentage of the total expected source videos to be included when the DC is generated. The system, for example the SIM therein, may calculate the expected generation time based on the past event statistics and notify the user about this.

According to another embodiment, in addition to the past event statistics, the system may utilize currently available statistics of the current event in the calculation to approximate a close fit PDF curve for the current event.

According to an embodiment, the DC can also be created from source videos coming in a specific time range. For example, the DC can be created using all the source videos that arrived today. As yet another example, the DC can be generated using all the source videos arrived since the beginning of the event.

According to an embodiment, the DC can also be created from source videos that contribute a certain total record length. For example, let us consider a situation where the service has user contribution of source content in chronological order, consisting of first 10 videos of 10 minutes each and next 20 videos of 2 minutes each. Now the user requests the service to use the first 2 hours total recording length of source videos contributed to the service to generate the DC. Consequently, the service generates the DC using the first 20 source videos, i.e. 10×10 min+10×2 min equals to 120 minutes or 2 hours of source content.

According to an embodiment, the DC can also be created from a specific number of source videos. For example, use the first 100 source videos to generate the DC.

According to an embodiment, the DC can also be created using a combined criterion of specific time, duration of total record time, number of users' videos, number of videos, which part of the event the source videos belong.

The service architecture thus provides the possibility for the service to signal the PDF distribution curve to the user which can be used by the user to request a DC taking into account the estimate time he/she would have to wait. The signaling mechanism also allows the user to signal to the system that he/she would be interested in a DC that incorporates x % of total videos or N number of videos or Y minutes of total recording length. The signalled user preferences enhance personalization of the DC, but it also enables the system to judge the amount of user contributed data that might satisfy the user, whereby the system may suggest new parameters for the creation of the DC.

For example, for a popular event that is attended by many thousands of users, if one user signals the need for having a DC that includes the 1 hour of total recorded length of user contributed content, the service would be able to generate the DC in a relatively short time compared to another person that has requested a DC that contains 60% of the expected user generated content.

In a different embodiment of implementation for the service architecture could consist of utilizing only the source content and their consumption feedback to generate the DC. The next iteration is triggered depending on the arrival of new source content to the service and/or the specified parameters given by the user for the new DC.

According to an embodiment, the service architecture signals the distribution information (e.g. the PDF) about the source video contribution to the user apparatus to help the user in estimating the expected delay due to his/her desired criteria for the DC creation.

According to an embodiment, the user apparatus may signal the user criteria for creating the next version of DC to the service architecture. The signaling vector may comprise various criteria consisting of, but not limited to, the specific time, duration of the total recorded time, number of users' videos, number of videos, which part of the event the videos belong.

A skilled man appreciates that any of the embodiments described above may be implemented as a combination with one or more of the other embodiments, unless there is explicitly or implicitly stated that certain embodiments are only alternatives to each other.

The various embodiments may provide advantages over state of the art. For example, the need to re-upload content from a user apparatus for generating a remix may be reduced. The light-weight previewing mechanism for the portable devices is context dependent, thus enabling to adapt the solution to low bandwidth networks and/or low-battery-power situation on the device. The existing content on social media portals can be re-used for generating value added content, especially video remixes. A user is enabled to request a remix with specific criteria regarding the source content to be used and, at the same time, the user is enabled to have an estimate about the completion of the remix beforehand while making the request. Efficiency in the remix generation process may be increased by reducing the need for generating unnecessary remix versions and at the same time generate a remix that is closely matching user specified criteria.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method for selecting content for a video remix, the method comprising:
   sending a request for multimedia preview content from a client device to one or more network domains;
   receiving one or more multimedia preview content from said one or more network domains;
   arranging the received multimedia preview content on a display of the client device for a user of the client device to select; and
   in response to receiving user input indicating selection of one or more preview content and a resolution of multimedia content corresponding to the selected one or more preview content, sending a request to a video remix service, the request including pointers to multimedia content on said one or more network domains corresponding to said selected one or more preview content, said pointers enabling the video remix service to download, at the requested resolution, the multimedia content for generating a video remix.

2. A method according to claim 1, the method further comprising
   sending a request to one or more client devices to select more content for the video remix, said request comprising an identifier for a subject of the video remix.

3. A method according to claim 1, the method further comprising
   arranging the received multimedia preview content from each of said one or more network domains to its own row on the display of the client device for the user of the client device to select.

4. A method according to claim 1, the method further comprising
   arranging the received multimedia preview content on the display of the client device as thumbnails, said thumbnails being linked to pointers to multimedia content on said one or more network domains corresponding to said thumbnails.

5. A method according to claim 1, wherein said request for multimedia preview content comprises parameters for adjusting properties of the multimedia preview content, such as resolution, size, quality or a type of the multimedia preview content according to display capabilities of the client device.

6. An apparatus comprising at least one processor and memory including computer program code, the memory and the computer program code configured to, with the at least one processor, cause the apparatus to at least:
   send a request for multimedia preview content from the apparatus to one or more network domains;
   receive one or more multimedia preview content from said one or more network domains;
   arrange the received multimedia preview content on a display of the apparatus for a user of the apparatus to select;
   receive user input indicating selection of one or more preview content and a resolution of multimedia content corresponding to the selected one or more preview content, and
   send a request to a video remix service, the request including pointers to multimedia content on said one or more network domains corresponding to said selected one or more preview content, said pointers enabling the video remix service to download, at the requested resolution, the multimedia content for generating a video remix.

7. An apparatus according to claim 6, further comprising computer program code configured to, with the at least one processor, cause the apparatus to at least:
   send a request to the video remix service to be forwarded to one or more client devices to select more content for the video remix, said request comprising an identifier for a subject of the video remix.

8. An apparatus according to claim 6, further comprising computer program code configured to, with the at least one processor, cause the apparatus to at least:
   arrange the received multimedia preview content from each of said one or more network domains to its own row on the display of the apparatus for the user of the apparatus to select.

9. An apparatus according to claim 6, further comprising computer program code configured to, with the at least one processor, cause the apparatus to at least:
   arrange the received multimedia preview content on the display of the apparatus as thumbnails, said thumbnails being linked to pointers to multimedia content on said one or more network domains corresponding to said thumbnails.

10. An apparatus according to claim 6, wherein said request for multimedia preview content comprises parameters for adjusting properties of the multimedia preview content, such as resolution, size, quality or a type of the multimedia preview content according to display capabilities of the client device.

11. A method for creating a video remix, the method comprising:
   receiving, in a server device, a request from a client device for creating an identifier for a subject of the video remix and for sending the identifier to one or more client devices;
   sending said identifier to said one or more client devices;
   receiving from said one or more client devices a request to generate a video remix, the request including said identifier and pointers to multimedia content on one or more network domains corresponding to one or more preview content selected from among one or more multimedia preview content at the one or more client devices, the request also including a resolution of the multimedia content corresponding to the one or more preview content;
   downloading, at the requested resolution, the multimedia content indicated by said pointers; and
   generating the video remix on the basis of the downloaded multimedia content.

12. A method according to claim 11, wherein the video remix is generated in an iterative process, wherein the input of the process comprises information regarding at least one of the following:
   multimedia source content available at the time of the video remix creation,
   user feedback of the multimedia source content available at the time of the video remix creation,
   at least one previous video remix version, or
   user feedback of the at least one previous video remix version.

13. A method according to claim 12, wherein the iterative process generates a subsequent video remix by using as an input at least the previous version of the video remix.

14. A method according to claim 11, the method further comprising
   determining a probability distribution function for estimating upload times of multimedia content regarding said subject of the video remix on said one or more network domains.

15. A method according to claim 11, the method further comprising
   receiving a request from at least one client device for generating the video remix, wherein the request includes criteria for the multimedia content to be included in the video remix, the criteria comprises at least one of the following:
   the number of multimedia content to be included in the video remix,
   the cumulated percentage of all expected multimedia content for said subject, after which percentage the generating of the video remix is started,
   total recording time to be covered by the video remix,
   a range for upload time of multimedia content eligible for the video remix,
   specific arrival time or arrival time interval of the multimedia content,
   duration of the multimedia content,
   the number of users providing the multimedia content,
   the part of the event to which the multimedia content belong.

16. An apparatus comprising at least one processor, memory including computer program code, the memory and the computer program code configured to, with the at least one processor, cause the apparatus to at least:
   receive a request from a client device for creating an identifier for a subject of the video remix and for sending the identifier to one or more client devices;
   send said identifier to said one or more client devices;
   receive from said one or more client devices a request to generate a video remix, the request including said identifier and pointers to multimedia content on one or more network domains corresponding to one or more preview content selected from among one or more multimedia preview content at the one or more client devices, the request also including a resolution of the multimedia content corresponding to the one or more preview content;
   download, at the requested resolution, the multimedia content indicated by said pointers; and
   generate the video remix on the basis of the downloaded multimedia content.

17. An apparatus according to claim 16, further comprising computer program code configured to, with the at least one processor, cause the apparatus to at least:
   generate the video remix in an iterative process, wherein the input of the process comprises information regarding at least one of the following:
   multimedia source content available at the time of the video remix creation,
   user feedback of the multimedia source content available at the time of the video remix creation,
   at least one previous video remix version, or
   user feedback of the at least one previous video remix version.

18. An apparatus according to claim 17, wherein the iterative process generates a subsequent video remix by using as an input at least the previous version of the video remix.

19. An apparatus according claim 16, further comprising computer program code configured to, with the at least one processor, cause the apparatus to at least:
   determine a probability distribution function for estimating upload times of multimedia content regarding said subject of the video remix on said one or more network domains.

20. An apparatus according to claim 16, further comprising computer program code configured to, with the at least one processor, cause the apparatus to at least:
   receive a request from at least one client device for generating the video remix, wherein the request includes criteria for the multimedia content to be included in the video remix, the criteria comprises at least one of the following:
   the number of multimedia content to be included in the video remix,
   the cumulated percentage of all expected multimedia content for said subject, after which percentage the generating of the video remix is started,
   total recording time to be covered by the video remix, a range for upload time of multimedia content eligible for the video remix,
specific arrival time or arrival time interval of the multimedia content,
duration of the multimedia content,
the number of users providing the multimedia content,
the part of the event to which the multimedia content belong.

* * * * *